United States Patent
Ozawa (10) Patent No.: US 8,763,049 B2
(45) Date of Patent: Jun. 24, 2014

(54) SERVER APPARATUS, VIDEO IMAGE QUALITY MEASUREMENT SYSTEM, VIDEO IMAGE QUALITY MEASUREMENT METHOD AND PROGRAM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/819,579

(22) PCT Filed: Aug. 26, 2011

(86) PCT No.: PCT/JP2011/069280
§ 371 (c)(1),
(2), (4) Date: Feb. 27, 2013

(87) PCT Pub. No.: WO2012/029648
PCT Pub. Date: Mar. 8, 2012

(65) Prior Publication Data
US 2013/0174203 A1    Jul. 4, 2013

(30) Foreign Application Priority Data
Aug. 30, 2010 (JP) .................. 2010-192589

(51) Int. Cl.
*H04N 7/173* (2011.01)
*H04N 21/24* (2011.01)
*H04M 15/00* (2006.01)

(52) U.S. Cl.
USPC .............................. 725/62; 348/193; 455/423

(58) Field of Classification Search
USPC ............. 725/62; 455/423, 425; 348/193, 607; 375/240.08
See application file for complete search history.

(56) References Cited

U.S. PATENT DOCUMENTS

| | | | |
|---|---|---|---|
| 2007/0280296 A1 | 12/2007 | Suzuki et al. | |
| 2011/0096665 A1* | 4/2011 | McCann et al. | 370/235 |
| 2011/0164546 A1* | 7/2011 | Mishra et al. | 370/312 |
| 2012/0110203 A1* | 5/2012 | Ozawa | 709/231 |
| 2013/0169744 A1* | 7/2013 | Jung | 348/14.12 |
| 2013/0174203 A1* | 7/2013 | Ozawa | 725/62 |

FOREIGN PATENT DOCUMENTS

| | | |
|---|---|---|
| JP | 11-004252 | 1/1999 |
| JP | 2007-324706 | 12/2007 |
| JP | 2009-060425 | 3/2009 |

OTHER PUBLICATIONS

International Search Report, PCT/JP2011/069280, Oct. 25, 2011.

* cited by examiner

*Primary Examiner* — Pankaj Kumar
*Assistant Examiner* — Reuben M Brown
(74) *Attorney, Agent, or Firm* — Young & Thompson (57) ABSTRACT

A server apparatus includes: a compression and encoding unit that compresses and encodes screen information or image information downloaded from a Web serve on the Internet in response to an instruction from a mobile terminal; a packet transmission unit that stores an output signal from the compression and encoding unit into a packet and transmits the packet to the mobile terminal via a packet forwarding apparatus(es); and a video image quality measurement unit that measures video image quality by referring to an input signal to the compression and encoding unit, a signal decoded from the output signal of the compression and encoding unit, a transmission timing of the packets, and a timing at which the mobile terminal receives the packet.

7 Claims, 6 Drawing Sheets

SERVER APPARATUS, VIDEO IMAGE QUALITY MEASUREMENT SYSTEM, VIDEO IMAGE QUALITY MEASUREMENT METHOD AND PROGRAM

CROSS-REFERENCE TO RELATED APPLICATIONS

This application is based upon and claims the benefit of the priority of Japanese patent application No. 2010-192589 filed on Aug. 30, 2010, the disclosure of which is incorporated herein in its entirety by reference thereto.

TECHNICAL FIELD

The present invention relates to a server apparatus, video image quality measurement system, video image quality measurement method, and program, and particularly to a server apparatus, remote video image quality measurement system, video image quality measurement method, and program that measure quality of a video image displayed on a mobile terminal when the mobile terminal operates while communicating with the server apparatus via a packet forwarding apparatus on a mobile network.

BACKGROUND

New services utilizing high-speed and high-capacity networks are expected to be created in the near future as the development of high-speed and high-capacity mobile packet networks progresses due to the introduction of LTE (Long Term Evolution) and EPC (Evolved Packet Core) technologies. Examples of the new services include high-definition 3D games, large database searches, image recognition/matching, high-definition images (still images, videos, etc.), 3D images, high-quality audio, and 3D audio. Further, for the purpose of ensuring the security of data, it is predicted that thin client services will be popular in mobile networks in the near future.

Patent Literature 1 describes a traffic control system that performs traffic control. The traffic control system comprises means for measuring communication quality on a communication line between a relay server (thin client server) and a client, and control means for controlling so that an amount of video data distributed to the relay server from a streaming server can be adjusted to an amount of streaming data specified based on the communication quality. In order to measure the communication quality, the response time of image data or the response time to ping transmission is measured.

Further, Patent Literature 2 describes a data transmission system that displays data with practical quality and time even when a relatively slow transmission line such as a telephone line or wireless communication is used between a terminal device with relatively slow processing capability such as a mobile terminal and a server apparatus. In the data transmission system, the server apparatus transmits data to the terminal device after converting the quality of data contents and the data format according to the processing capability of the terminal device.

PTL 1:
Japanese Patent Kokai Publication No. JP2009-060425A
PTL 2:
Japanese Patent Kokai Publication No. JP-H11-004252A

SUMMARY

Each disclosure of Patent Literatures listed above is incorporated herein in its entirety by reference thereto. The following analysis is given by the present inventor.

In order to widely use a thin client service in a mobile packet network, a server apparatus needs to measure the video image quality and determine whether or not the limit of the maximum transmission rate and forward delay restrictions in a mobile packet network will be an issue in implementing the thin client service from the standpoint of the video image quality and the response time.

According to the invention described in Patent Literature 1, since the server apparatus only measures response time, the objective quality of a video image cannot be determined. Further, according to Patent Literature 2, since the server apparatus does not measure response time or video image quality, the objective quality of a video image cannot be evaluated. Here, the "objective quality" is different from the subjective quality based on a psychological evaluation by a human who actually views/listens a video or audio, and means the quality of a video image or audio based on the measurement of a quantifiable physical quantity.

Therefore, there is a need in the art to provide a server apparatus, video image quality measurement system, video image quality measurement method, and program that contribute to enable the server apparatus to measure the objective quality of a video image displayed on a mobile terminal when the mobile terminal operates while communicating with the server apparatus via a packet forwarding apparatus on a mobile network.

According to a first aspect of the present invention, there is provided a server apparatus, connected to a mobile terminal via a packet forwarding apparatus(es) on a mobile network, the server apparatus comprising:
a compression and encoding unit that compresses and encodes screen information or image information, downloaded from a Web server on the Internet in response to an instruction from the mobile terminal;
a packet transmission unit that stores an output signal from the compression and encoding unit into a packet and transmits the packet to the mobile terminal via the packet forwarding apparatus(es); and
a video image quality measurement unit that measures video image quality by referring to an input signal to the compression and encoding unit, a signal decoded from the output signal of the compression and encoding unit, a transmission timing of the packet, and a timing at which the mobile terminal receives the packet.

According to a second aspect of the present invention, there is provided a video image quality measurement method, comprising:
by a server apparatus connected to a mobile terminal via a packet forwarding apparatus(es) on a mobile network, compressing and encoding screen information or image information, downloaded from a Web server on the Internet in response to an instruction from the mobile terminal;
storing an output signal from the compression encoding into a packet and transmitting the packet to the mobile terminal via the packet forwarding apparatus(es); and
measuring video image quality by referring to an input signal for the compression encoding, a signal decoded from the output signal of the compression encoding, a transmission timing of the packet, and a timing at which the mobile terminal receives the packet.

According to a third aspect of the present invention, there is provided a program, causing a computer connected to a mobile terminal via a packet forwarding apparatus(es) on a mobile packet network to execute:
compressing and encoding screen information or image information, downloaded from a Web server on the Internet in response to an instruction from the mobile terminal;

storing an output signal from the compression encoding into a packet and transmitting the packet to the mobile terminal via the packet forwarding apparatus(es); and measuring video image quality by referring to an input signal for the compression encoding, a signal decoded from the output signal of the compression encoding, a transmission timing of the packet, and a timing at which the mobile terminal receives the packet.

The present disclosure provides the following advantage, but not restricted thereto. According to the server apparatus, the video image quality measurement system, the video image quality measurement method, and the program relating to the present invention, the objective quality of a video image displayed on the mobile terminal can be measured by the server apparatus when the mobile terminal operates while communicating with the server apparatus via the packet forwarding apparatus on the mobile network.

MODES

In the present disclosure, there are various possible modes, which include the following, but not restricted thereto. A server apparatus according to a first mode may be the server apparatus relating to the first aspect.

In a server apparatus according to a second mode, the video image quality measurement unit may calculate a PSNR (Picture Signal to Noise Ratio) based on the input signal to the compression and encoding unit and the signal decoded from the output signal of the compression and encoding unit, calculate a response time based on the transmission timing of the packet and the timing at which the mobile terminal receives the packet, and derive the video image quality from the calculated PSNR and response time.

In a server apparatus according to a third mode, the video image quality measurement unit may derive the video image quality as a sum between the PSNR and the response time, respectively with weighting.

A server apparatus according to a fourth mode may further comprise: an accumulation unit that accumulates the input signal to the compression and encoding unit, the output signal from the compression and encoding unit or the signal decoded from the output signal from the compression and encoding unit, the transmission timing of the packet, and the timing at which the mobile terminal receives the packet.

A mobile terminal according to a fifth mode may comprise: a reproduction unit that receives the packet from the server apparatus according to one embodiment via the mobile network, has a decoder decode the output signal from the compression and encoding unit stored in the packet to display a screen; and a transmission unit that stores the reception timing of the packet in a reception response and transmits the reception response to the server apparatus.

A video image quality measurement system according to a sixth mode may comprise the above server apparatus and the above mobile terminal.

In a video image quality measurement system according to a seventh mode, the mobile network may be a mobile packet network, or mobile LTE/EPC (Long Term Evolution/Evolved Packet Core) network.

In a video image quality measurement system according to an eighth mode, the packet forwarding apparatus may be an SGSN/GGSN (Serving General packet radio service Support Node/Gateway General packet radio service Support Node) apparatus or S/P-GW (Serving Gateway/Packet data network Gateway) apparatus.

A video image quality measurement method according to a ninth mode may be the video image quality measurement method relating to the second aspect.

According to the server apparatus, the video image quality measurement system, and the video image quality measurement method relating to the present invention, the objective quality of a video image displayed on the mobile terminal can be measured by the server apparatus when the mobile terminal operates while communicating with the server apparatus via the packet forwarding apparatus(es) on the mobile network.

First Exemplary Embodiment

A server apparatus relating to a first exemplary embodiment will be described in detail with reference to the drawings.

Figure 1:
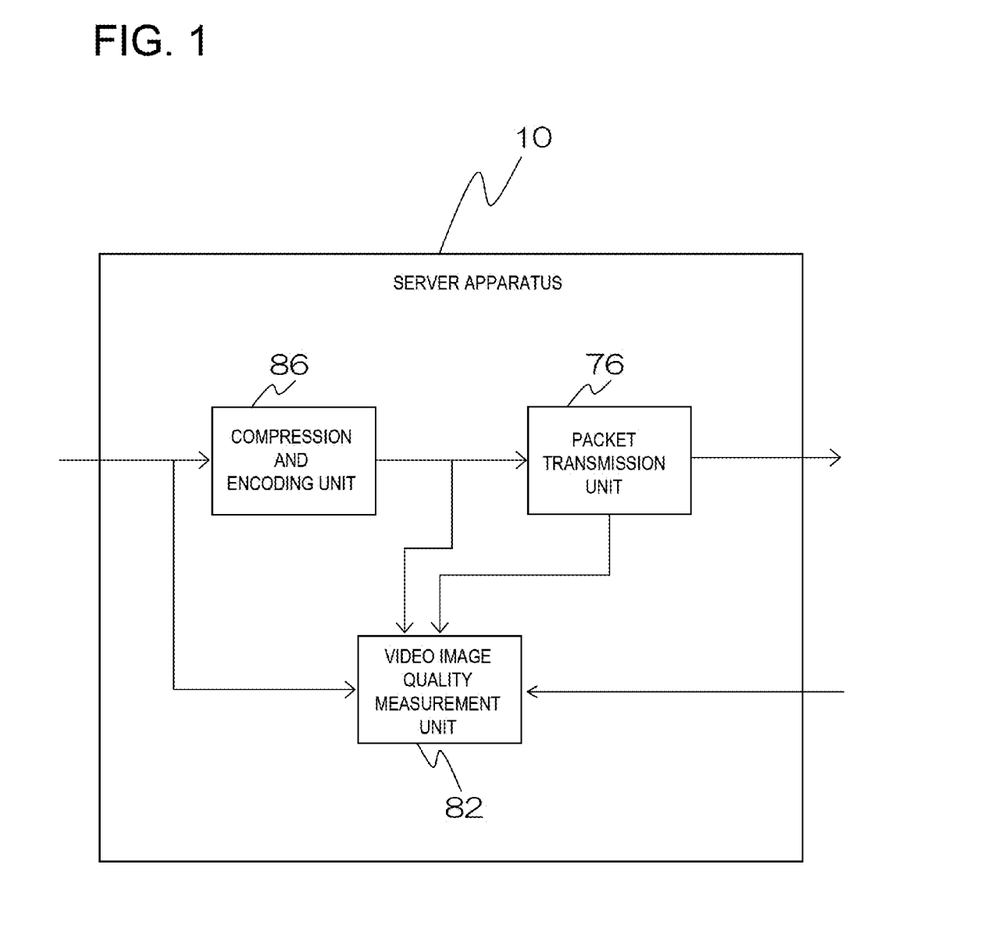
FIG. 1 is a block diagram illustrating a configuration of a server apparatus relating to a first exemplary embodiment as an example.

FIG. 1 is a block diagram illustrating a configuration of a server apparatus 10 of the present exemplary embodiment. With reference to FIG. 1, the server apparatus 10 is a server apparatus connected to a mobile terminal via a packet forwarding apparatus on a mobile network. The server apparatus 10 comprises a compression and encoding unit 86 that compresses and encodes screen information or image information, downloaded from a Web server on the Internet in response to an instruction from a mobile terminal; a packet transmission unit 76 that stores an output signal from the compression and encoding unit 86 into a packet and transmits the packet to the mobile terminal via the packet forwarding apparatus; and a video image quality measurement unit 82 that measures video image quality by referring to an input signal to the compression and encoding unit 86, a signal decoded from the output signal of the compression and encoding unit 86, a transmission timing of the packet, and a timing at which the mobile terminal receives the packet.

The video image quality measurement unit 82 may calculate PSNR (Picture Signal to Noise Ratio) based on the input signal to the compression and encoding unit 86 and the signal decoded from the output signal of the compression and encoding unit 86, calculate a response time based on the timing at which the packet transmission unit 76 transmits the packet and the timing at which the mobile terminal receives the packet, and derive the video image quality from the calculated PSNR and response time. Here, the video image quality measurement unit 82 may derive as the video image quality a sum between the PSNR and the response time, respectively with weighting.

Further, the server apparatus 10 may further comprise an accumulation unit that accumulates the input signal to the compression and encoding unit 86, the output signal from the compression and encoding unit 86 or the signal decoded from the output signal from the compression and encoding unit 86, the timing at which the packet transmission unit 76 transmits the packet, and the timing at which the mobile terminal receives the packet.

Further, it is preferable that the mobile terminal comprise a reproduction unit that receives the packet from the server apparatus 10 via the mobile network, has a decoder decode the output signal from the compression and encoding unit 86 stored in the packet to display a screen, and a transmission unit that stores the reception timing of the packet in a reception response and transmits it to the server apparatus 10. Further, according to the present disclosure, there is provided a video image quality measurement system including the server apparatus 10 and this mobile terminal.

According to the server apparatus 10 of the present exemplary embodiment and the video image quality measurement system comprising the server apparatus 10, the objective quality of a video image displayed on the mobile terminal can be measured by the server apparatus 10 when the mobile terminal operates while communicating with the server apparatus 10 via the packet forwarding apparatus on the mobile network.

Second Exemplary Embodiment

With reference to FIGS. 2 to 5, a video image quality measurement system relating to a second exemplary embodiment will be described in detail.

Figure 2:
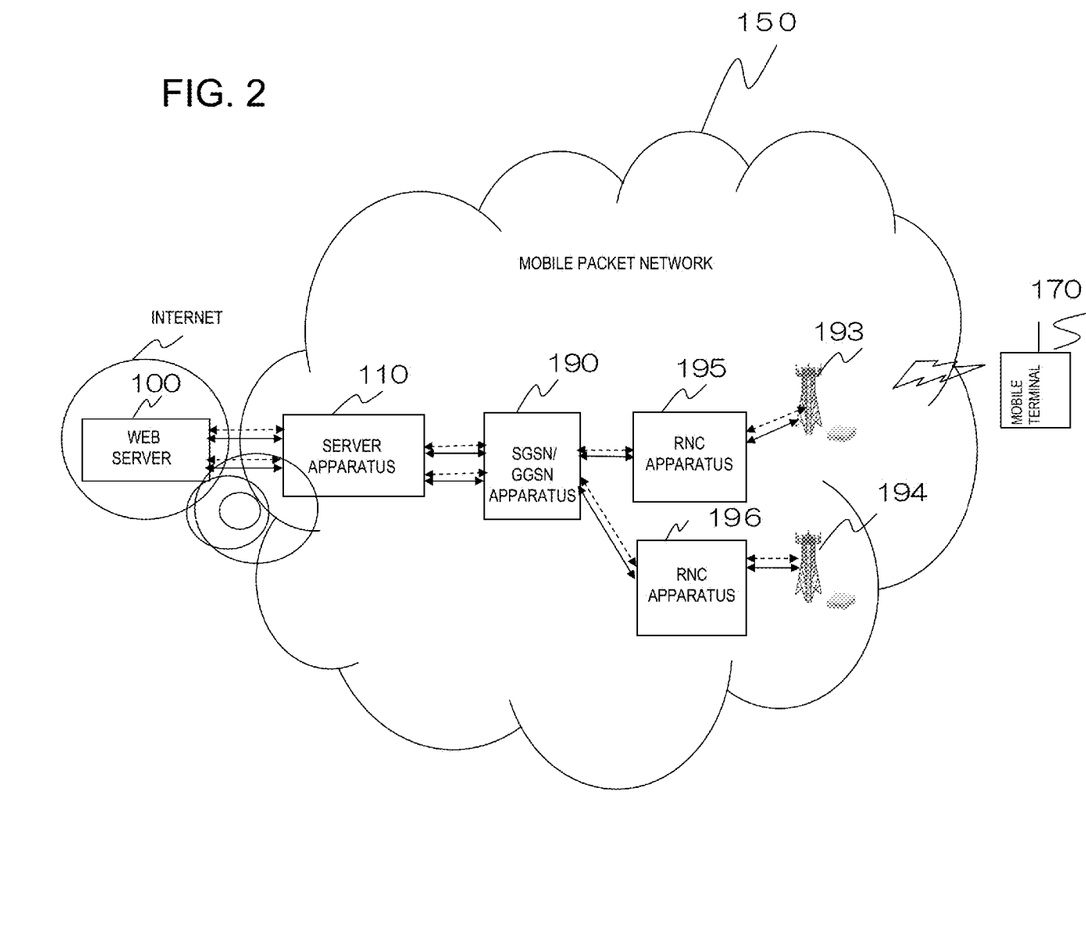
FIG. 2 is a drawing illustrating a connection configuration of a video image quality measurement system relating to a second exemplary embodiment as an example.

FIG. 2 is a drawing illustrating a connection configuration of the video image quality measurement system relating to the present exemplary embodiment. FIG. 2 shows a configuration in which a 3G mobile packet network is used as the mobile network and an SGSN/GGSN (xGSN) apparatus is used as the packet forwarding apparatus. With reference to FIG. 2, a server apparatus 110, an SGSN/GGSN apparatus 190, RNC (Radio Network Controller) apparatuses 195 and 196, and base stations 193 and 194 are provided on a mobile packet network 150. The server apparatus 110 is connected to a Web server 100 on the Internet.

Here, the SGSN/GGSN apparatus denotes an apparatus in which an SGSN (Serving General packet radio service Support Node) apparatus and a GGSN (Gateway General packet radio service Support Node) apparatus are integrated. Further, FIG. 2 shows an example of a thin client service, but the present disclosure can be applied to other services as well.

In FIG. 2, a mobile terminal 170 connects to a first virtual client of the server apparatus 110 provided on the mobile packet network 150, and by operating this, the mobile terminal 170 sends an instruction signal to the server apparatus 110 via the base station 193, the RNC apparatus 195, and the SGSN/GGSN apparatus 190 in order to browse content (for instance video content) on the Web server 100 on the Internet. Here, the instruction signal denotes a signal sent from the mobile terminal 170 by means of a key operation or special character input on the mobile terminal 170.

The instruction signal sent from the mobile terminal 170 reaches the base station 193, the RNC apparatus 195, the SGSN/GGSN apparatus 190, and the server apparatus 110 on the mobile packet network 150 in this order. The server apparatus 110 receives the instruction signal from the mobile terminal 170 as described.

As the protocol of the instruction signal, known protocols can be adopted. Here, as an example, TCP/IP (Transmission Control Protocol/Internet Protocol) and HTTP (Hypertext Transmission Protocol) as the upper layer protocol thereof are used as the protocols of the instruction signal. Further, instead of HTTP, SIP (Session Initiation Protocol) can be used as well.

A monitor apparatus (not shown in the drawing) is connected to the server apparatus 110. The monitor device displays the results of measuring the quality of a video image received by the mobile terminal and the response time it takes to receive a video on the mobile terminal.

Figure 3:
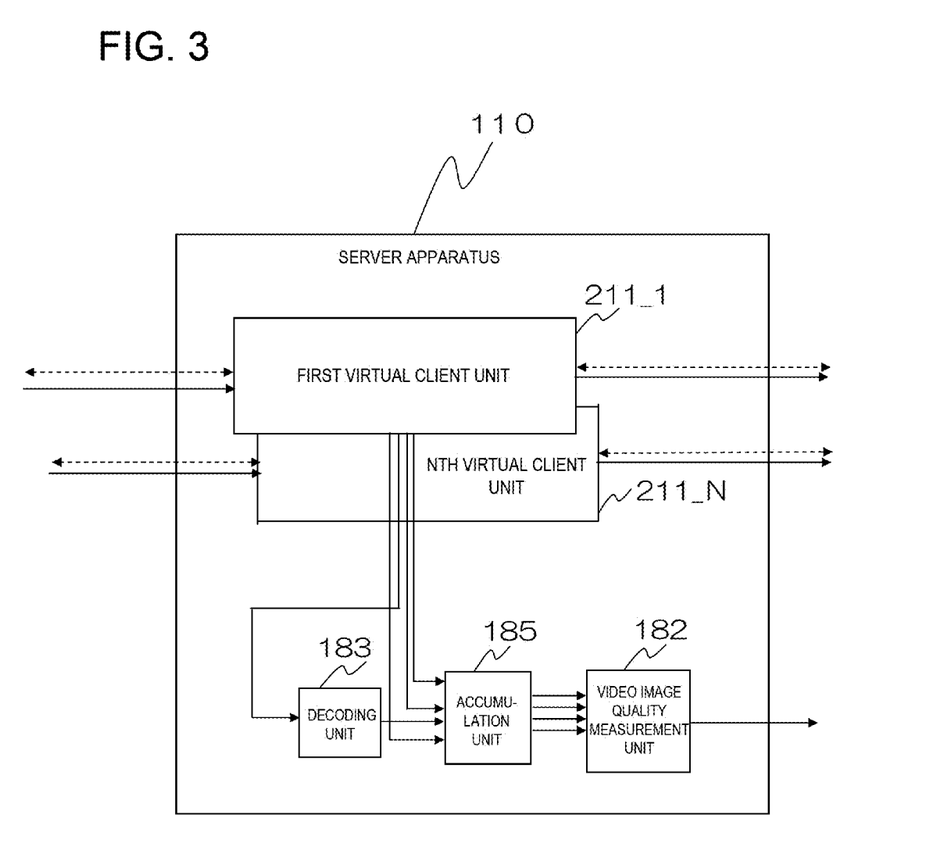
FIG. 3 is a block diagram illustrating a configuration of a server apparatus in the video image quality measurement system relating to the second exemplary embodiment as an example.

FIG. 3 is a block diagram illustrating a configuration of the server apparatus 110. With reference to FIG. 3, the server apparatus 110 comprises N number of virtual client units 211_1 to 211_N, a decoding unit 183, an accumulation unit 185, and a video image quality measurement unit 182.

In order to provide a virtual client function to each of N number of mobile terminals, the server apparatus 110 comprises N number of virtual client units 211_1 to 211_N. Here, for instance, N 2. In the explanation below, the mobile terminal 170 connects to the first virtual client unit 211_1. In other words, the first virtual client unit 211_1 connects to the first mobile terminal 170, and the Nth virtual client unit 211_N connects to another mobile terminal.

In FIG. 3, the virtual client unit 211_1 exchanges control signals (indicated by dashed lines in FIG. 3) such as the instruction signal from the mobile terminal 170 with the SGSN/GGSN apparatus 190, and outputs data signals such as a compressed/encoded screen signal and a compressed/encoded audio signal to the mobile terminal 170 (indicated by solid lines in FIG. 3).

Figure 4:
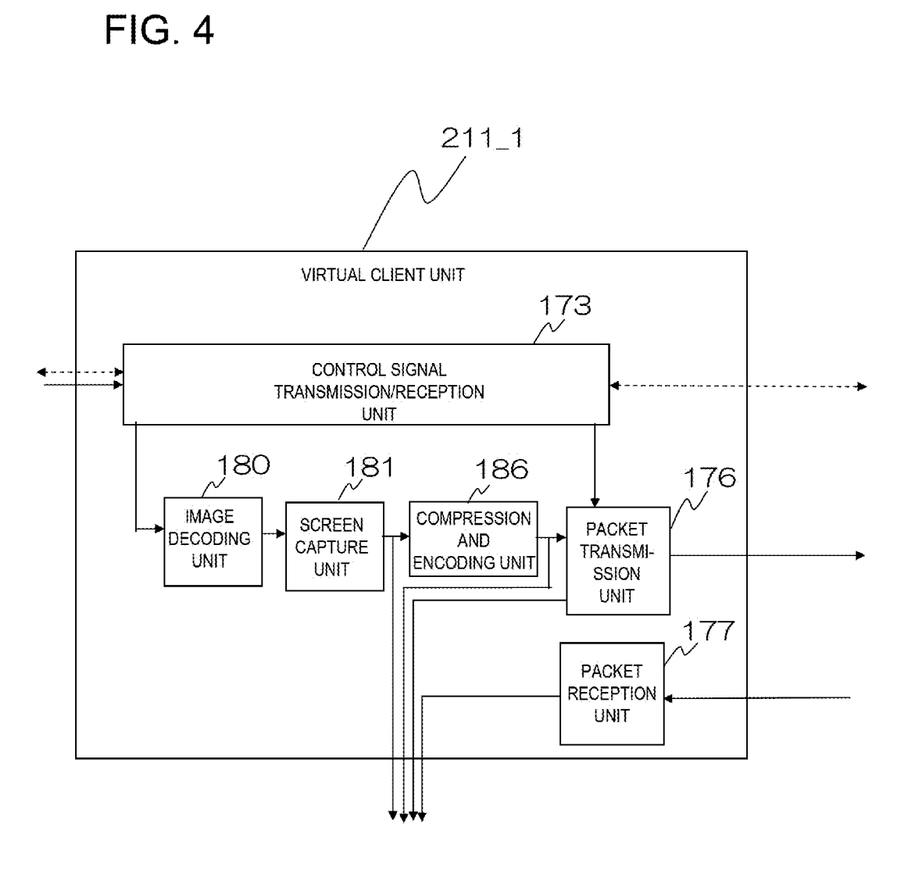
FIG. 4 is a block diagram illustrating a configuration of a virtual client unit in the server apparatus of the video image quality measurement system relating to the second exemplary embodiment as an example.

FIG. 4 is a block diagram illustrating a configuration of the first virtual client unit 211_1. Since the configurations of the virtual client units 211_2 to 211_N are identical to that of the virtual client unit 211_1, explanation of them will be omitted.

With reference to FIG. 4, the virtual client unit 211_1 comprises a control signal transmission/reception unit 173, an image decoding unit 180, a screen capture unit 181, a compression and encoding unit 186, a packet transmission unit 176, and a packet reception unit 177.

The control signal transmission/reception unit 173 receives the instruction signal from the mobile terminal 170 via the SGSN/GGSN apparatus 190. Here, as an example, the instruction signal is assumed to be an instruction signal for starting an application for browsing video content on the Web server 100 on the Internet.

Upon receiving the instruction signal, the control signal transmission/reception unit 173 connects to the Web server 100, having a destination URL or IP address stored in the instruction signal, on the Internet. The control signal transmission/reception unit 173 downloads a video content file from the Web server 100, extracts image data from the file, and outputs the data to the image decoding unit 180.

The image decoding unit 180 decodes the image data and outputs the decoded image signal to the screen capture unit 181 and the accumulation unit 185 in FIG. 3.

The screen capture unit 181 captures all or part of the screen at a predetermined screen resolution and outputs the result to the compression and encoding unit 186.

The compression and encoding unit 186 compression-encodes the image data outputted from the screen capture unit 181 using a predetermined compression encoding method and outputs the compression-encoded data to the packet transmission unit 176.

The packet transmission unit 176 receives the compression-encoded data outputted from the compression and encoding unit 186, stores it in the payload of a packet, and sends the packet to the SGSN/GGSN apparatus 190. Here, as an example, the packet is sent using the RTP/UDP protocol (Real-time Transport Protocol/User Datagram Protocol). Note that other protocols can be used as well. When sending the packet via RTP/UDP, the packet transmission unit 176 gives an RTP timestamp and sequence number (SN) to each RTP packet before sending it. The packet transmission unit 176 outputs the timestamp value and the sequence number of each packet to the accumulation unit 185.

The accumulation unit 185 accumulates the timestamp value and the sequence number of each virtual client for each session.

The packet reception unit 177 receives a response packet to each packet sent by the packet transmission unit 176 from the mobile terminal 170 via the SGSN/GGSN apparatus 190. The packet reception unit 177 reads the sequence number of the corresponding transmitted packet and reception time information indicating the time the mobile terminal 170 received the packet stored in the response packet, and outputs these pieces of information to the accumulation unit 185 for each session. The accumulation unit 185 accumulates the sequence number and the reception time information for each session.

Next, with reference to FIG. 3, a function block regarding image quality measurement will be described. The decoding unit 183 receives the output signal of the compression and encoding unit 186, decodes the output signal of the compression and encoding unit 186 using a decoder with the same codec, and outputs the result to the accumulation unit 185.

For each virtual client, the accumulation unit 185 accumulates the input signal of the compression and encoding unit 186, the output signal of the decoding unit 183, the timestamp and the sequence number from the packet transmission unit 176 at the time of packet transmission, and the timestamp and the sequence number form the packet reception unit 177 at the time of packet reception by the mobile terminal for each session.

Figure 5:
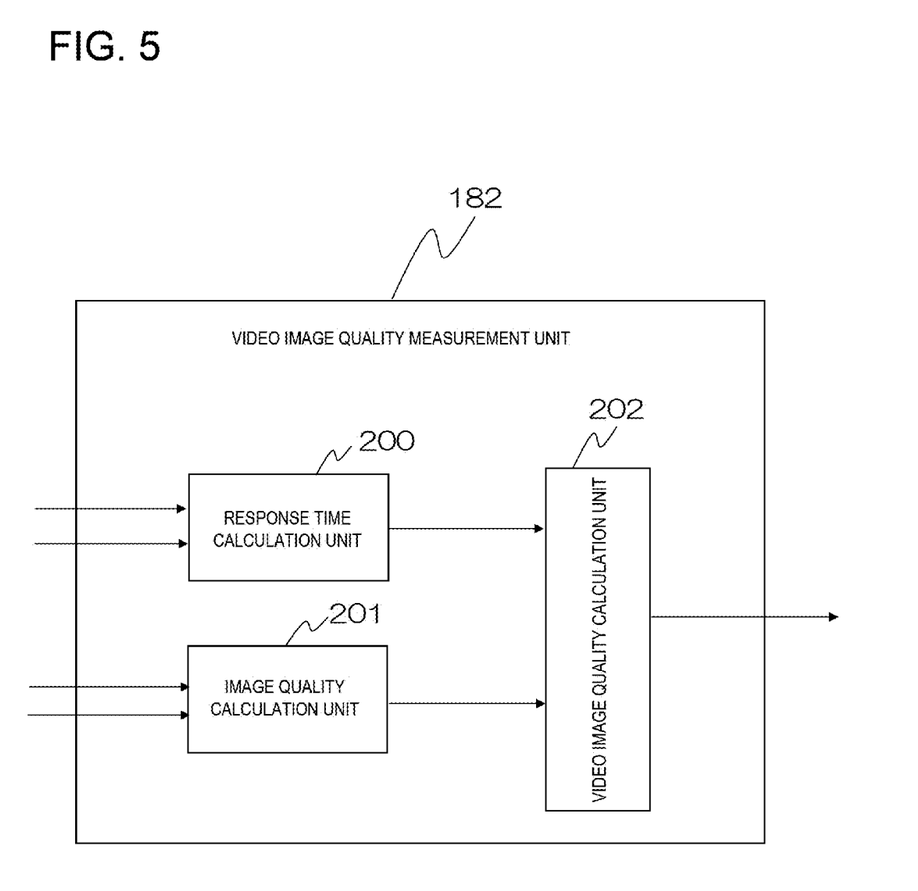
FIG. 5 is a block diagram illustrating a configuration of a video image quality measurement unit in the server apparatus of the video image quality measurement system relating to the second exemplary embodiment as an example.

FIG. 5 is a block diagram illustrating a configuration of the video image quality measurement unit 182. With reference to FIG. 5, the video image quality measurement unit 182 comprises a response time calculation unit 200, an image quality calculation unit 201, and a video image quality calculation unit 202.

Using the information accumulated in the accumulation unit 185, the video image quality measurement unit 182 calculates image quality and delay quality. The video image quality measurement unit 182 specifies a session for a virtual client that needs video image quality measurement, reads the accumulated information from the accumulation unit 185, and calculates a video image quality index.

The image quality calculation unit 201 calculates PSNR (Picture Signal to Noise Ratio) between the output signal of the image decoding unit 180 and the output signal of the compression and encoding unit 186, and outputs the result to the video image quality calculation unit 202.

From the sequence number of the transmitted packet from the packet transmission unit 176 and the sequence number of the response packet from the packet reception unit 177, both accumulated in the accumulation unit 185, the response time calculation unit 200 links the transmission timestamp (transmission time) from the packet transmission unit 176 with the reception timestamp (reception time (period)) from the packet reception unit 177, and calculates the response time (period) $\tau$ using the following equation (1).

$$\text{Response time } \tau = \text{reception time} - \text{transmission time} \quad (1)$$

The response time calculation unit 200 outputs the calculated response time $\tau$ to the video image quality calculation unit 202.

The video image quality calculation unit 202 calculates the overall video image quality index based on the PSNR received from the image quality calculation unit 201 and the response time $\tau$ received from the response time calculation unit 200, using the following equation.

$$\text{Overall video image quality index} = \alpha 1 * \text{PSNR} + \alpha 2 * \tau \quad (2)$$

In equation (2), $\alpha 1$ and $\alpha 2$ are both weight coefficients and set to appropriate values.

Further, the server apparatus 110 may connect to a content distribution server, instead of the Web server 100, and read a file or stream of the content to be viewed from the content distribution server.

According to the present exemplary embodiment, the server apparatus 110 measures the vide image quality while implementing a thin client service. Consequently, the server apparatus 110 is able to determine whether or not the limit of the maximum transmission rate and forward delay restrictions in the mobile packet network 150 will be an issue in implementing the thin client service from the standpoint of the video image quality and the response time.

Third Exemplary Embodiment

Figure 6:
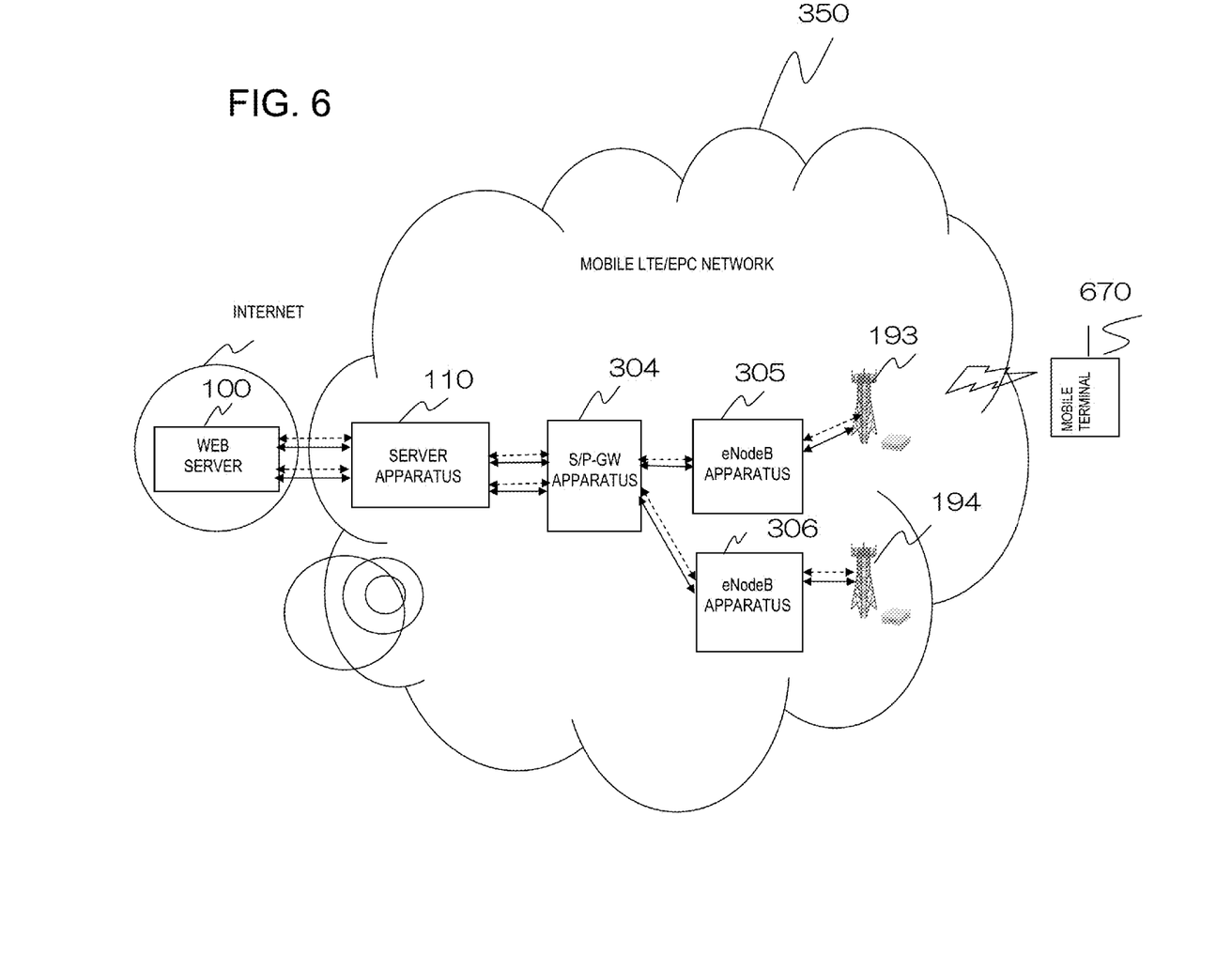
FIG. 6 is a drawing illustrating a connection configuration of a video image quality measurement system relating to a third exemplary embodiment as an example.

A video image quality measurement system relating to a third exemplary embodiment will be described with reference to the drawings. FIG. 6 is a drawing illustrating a connection configuration of the video image quality measurement system of the present exemplary embodiment. The operations of the components given the same numbers in FIGS. 2 and 6 are the same; therefore, explanation of them will be omitted.

FIGS. 6 and 2 are different in that a mobile terminal 670 in FIG. 6 connects to the server apparatus 110 via a mobile LTE/EPC network 350 and through eNodeB (enhanced NodeB, evolved NodeB) apparatuses 305 and 306, and an S/P-GW apparatus 304. According to the configuration in FIG. 6, much faster packet forwarding is possible, compared to the case of the mobile packet network 150 in FIG. 2.

The eNodeB apparatuses 305 and 306 achieve much faster packet transmission in a wireless zone with the mobile terminal 670 than conventionally possible using the LTE technology. Further, the S/P-GW apparatus 304 and the server apparatus 110 are connected using the IP protocol. Therefore, the server apparatus 110 (FIG. 2) in the first exemplary embodiment can be used for the connection with the S/P-GW apparatus 304 without changing it.

The S/P-GW apparatus 304 receives a packet using the TCP/IP or UDP/IP protocol or a file forwarded over one of these protocols from the server apparatus 110, converts it into the GTP-U (GPRS Tunneling Protocol-User Plane)/TCP/IP or GTP-U/UDP/IP protocol, and outputs a compressed and encoded bit stream or file to the eNodeB apparatuses 305 and 306.

The eNodeB apparatuses 305 and 306 convert the compressed and encoded bit stream or file received into the PDCP/RLC (Packet Data Convergence Protocol/Radio Link Control) protocol and output the converted packet or file to the mobile terminal 670.

Further, instead of using the configuration of the second or the third exemplary embodiment, a configuration in which these are combined can be adopted. Further, the SGSN/GGSN apparatus 190 in the second exemplary embodiment can be provided separately as an SGSN apparatus and a GGSN apparatus.

Further, in the second and third exemplary embodiments above, SIP (Session Initiation Protocol) or SDP (Session Description Protocol) may be used for the instruction signal from the mobile terminal to the server.

Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

Further, part or all of the exemplary embodiments above can be described as the following appendixes without being limited thereto.

Appendix 1

A server apparatus connected to a mobile terminal via a packet forwarding apparatus(es) on a mobile network, the server apparatus comprising:
a compression and encoding unit that compresses and encodes screen information or image information, downloaded from a Web server on the Internet in response to an instruction from the mobile terminal;
a packet transmission unit that stores an output signal from the compression and encoding unit into a packet and transmits the packet to the mobile terminal via the packet forwarding apparatus(es); and
a video image quality measurement unit that measures video image quality by referring to an input signal to the compression and encoding unit, a signal decoded from the output signal of the compression and encoding unit, a transmission timing of the packet, and a timing at which the mobile terminal receives the packet.

Appendix 2

The server apparatus according to Appendix 1, wherein the video image quality measurement unit calculates a PSNR (Picture Signal to Noise Ratio) based on the input signal to the compression and encoding unit and the signal decoded from the output signal of the compression and encoding unit, calculates a response time based on the transmission timing of the packet and the timing at which the mobile terminal receives the packet, and derives the video image quality from the calculated PSNR and response time.

Appendix 3

The server apparatus according to Appendix 2, wherein the video image quality measurement unit derives as the video image quality a sum between the PSNR and the response time, respectively with weighting.

Appendix 4

The server apparatus according to any one of Appendices 1 to 3, further comprising:
an accumulation unit that accumulates the input signal to the compression and encoding unit, the output signal from the compression and encoding unit or the signal decoded from the output signal from the compression and encoding unit, the transmission timing of the packet, and the timing at which the mobile terminal receives the packet.

Appendix 5

A mobile terminal comprising:
a reproduction unit that receives the packet from the server apparatus according to any one of Appendices 1 to 4 via the mobile network, has a decoder decode the output signal from the compression and encoding unit stored in the packet to display a screen; and
a transmission unit that stores the reception timing of the packet in a reception response and transmits the reception response to the server apparatus.

Appendix 6

A video image quality measurement system comprising:
the server apparatus according to any one of Appendices 1 to 4; and the mobile terminal according to Appendix 5.

Appendix 7

The video image quality measurement system according to Appendix 6, wherein
the mobile network is a mobile packet network, or mobile LTE/EPC (Long Term Evolution/Evolved Packet Core) network.

Appendix 8

The video image quality measurement system according to Appendix 7, wherein
the packet forwarding apparatus(es) is an SGSN/GGSN (Serving General packet radio service Support Node/Gateway General packet radio service Support Node) apparatus or S/P-GW (Serving Gateway/Packet data network Gateway) apparatus.

Appendix 9

A video image quality measurement method, comprising:
by a server apparatus connected to a mobile terminal via a packet forwarding apparatus(es) on a mobile network, compressing and encoding screen information or image information, downloaded from a Web server on the Internet in response to an instruction from the mobile terminal;
storing an output signal from the compression encoding into a packet and transmitting the packet to the mobile terminal via the packet forwarding apparatus(es); and
measuring video image quality by referring to an input signal for the compression encoding, a signal decoded from the output signal of the compression encoding, a transmission timing of the packet, and a timing at which the mobile terminal receives the packet.

Appendix 10

The video image quality measurement method according to Appendix 9, wherein
the measuring comprises: calculating a PSNR (Picture Signal to Noise Ratio) based on the input signal for the compression encoding and the signal decoded from the output signal of the compression encoding;
calculating a response time based on the transmission timing of the packet and the timing at which the mobile terminal receives the packet; and
deriving the video image quality from the calculated PSNR and response time.

Appendix 11

A program, causing a computer connected to a mobile terminal via a packet forwarding apparatus(es) on a mobile packet network to execute:
compressing and encoding screen information or image information, downloaded from a Web server on the Internet in response to an instruction from the mobile terminal;
storing an output signal from the compression encoding into a packet and transmitting the packet to the mobile terminal via the packet forwarding apparatus(es); and
measuring video image quality by referring to an input signal for the compression encoding, a signal decoded from the output signal of the compression encoding, a transmission timing of the packet, and a timing at which the mobile terminal receives the packet.

Appendix 12

The program according to Appendix 11, causing the computer to execute:
calculating a PSNR (Picture Signal to Noise Ratio) based on the input signal for the compression encoding and the signal decoded from the output signal of the compression encoding;
calculating a response time based on the transmission timing of the packet and the timing at which the mobile terminal receives the packet; and
deriving the video image quality from the calculated PSNR and response time.

REFERENCE SIGNS LIST 10, 110: server apparatus
76, 176: packet transmission unit
82, 182: video image quality measurement unit
86, 186: compression and encoding unit
100: Web server
150: mobile packet network
170, 670: mobile terminal
173: control signal transmission/reception unit
177: packet reception unit
180: image decoding unit
181: screen capture unit
183: decoding unit
185: accumulation unit
190: SGSN/GGSN apparatus
193, 194: base station
195, 196: RNC apparatus
200: response time calculation unit
201: image quality calculation unit
202: video image quality calculation unit
211_1 to 211_N: virtual client unit
304: S/P-GW apparatus
305, 306: eNodeB apparatus
350: mobile LTE/EPC network

The invention claimed is:
1. A server apparatus, connected to a mobile terminal via a packet forwarding apparatus(es) on a mobile network, the server apparatus comprising:
a compression and encoding unit that compresses and encodes screen information or image information, downloaded from a Web server on the Internet in response to an instruction from the mobile terminal;
a packet transmission unit that stores an output signal from the compression and encoding unit into a packet and transmits the packet to the mobile terminal via the packet forwarding apparatus(es); and
a video image quality measurement unit that measures video image quality by referring to an input signal to the compression and encoding unit, a signal decoded from the output signal of the compression and encoding unit, a transmission timing of the packet, and a timing at which the mobile terminal receives the packet,
wherein the video image quality measurement unit calculates a PSNR (Picture Signal to Noise Ratio) based on the input signal to the compression and encoding unit and the signal decoded from the output signal of the compression and encoding unit, calculates a response time based on the transmission timing of the packet and the timing at which the mobile terminal receives the packet, and derives the video image quality from the calculated PSNR and response time, and
wherein the video image quality measurement unit derives as the video image quality a sum between the PSNR and the response time, respectively with weighting.
2. The server apparatus according to claim 1, further comprising:
an accumulation unit that accumulates the input signal to the compression and encoding unit, the output signal from the compression and encoding unit or the signal decoded from the output signal from the compression and encoding unit, the transmission timing of the packet, and the timing at which the mobile terminal receives the packet.
3. A mobile terminal, comprising:
a reproduction unit that receives the packet from the server apparatus according to claim 1 via the mobile network, has a decoder decode the output signal from the compression and encoding unit stored in the packet to display a screen; and
a transmission unit that stores the reception timing of the packet in a reception response and transmits the reception response to the server apparatus.
4. A video image quality measurement system, comprising:
a server apparatus; and
a mobile terminal,
wherein the server apparatus is connected to the mobile terminal via a packet forwarding apparatus(es) on a mobile network,
wherein the server apparatus comprises:
a compression and encoding unit that compresses and encodes screen information or image information, downloaded from a Web server on the Internet in response to an instruction from the mobile terminal;
a packet transmission unit that stores an output signal from the compression and encoding unit into a packet and transmits the packet to the mobile terminal via the packet forwarding apparatus(es); and a video image quality measurement unit that measures video image quality by referring to an input signal to the compression and encoding unit, a signal decoded from the output signal of the compression and encoding unit, a transmission timing of the packet, and a timing at which the mobile terminal receives the packet, wherein the mobile terminal comprises:
  a reproduction unit that receives the packet from the server apparatus via the mobile network, has a decoder decode the output signal from the compression and encoding unit stored in the packet to display a screen; and
  a transmission unit that stores the reception timing of the packet in a reception response and transmits the reception response to the server apparatus, wherein the video image quality measurement unit calculates a PSNR (Picture Signal to Noise Ratio) based on the input signal to the compression and encoding unit and the signal decoded from the output signal of the compression and encoding unit, calculates a response time based on the transmission timing of the packet and the timing at which the mobile terminal receives the packet, and derives the video image quality from the calculated PSNR and response time, and wherein the video image quality measurement unit derives as the video image quality a sum between the PSNR and the response time, respectively with weighting.

5. The video image quality measurement system according to claim 4, wherein
  the mobile network is a mobile packet network, or mobile LTE/EPC (Long Term Evolution/Evolved Packet Core) network.

6. The video image quality measurement system according to claim 5, wherein
the packet forwarding apparatus(es) is an SGSN/GGSN (Serving General packet radio service Support Node/Gateway General packet radio service Support Node) apparatus or S/P-GW (Serving Gateway/Packet data network Gateway) apparatus.

7. A video image quality measurement method, comprising:
  by a server apparatus connected to a mobile terminal via a packet forwarding apparatus(es) on a mobile network, compressing and encoding screen information or image information, downloaded from a Web server on the Internet in response to an instruction from the mobile terminal;
  storing an output signal from the compression encoding into a packet and transmitting the packet to the mobile terminal via the packet forwarding apparatus(es); and
  measuring video image quality by referring to an input signal for the compression encoding, a signal decoded from the output signal of the compression encoding, a transmission timing of the packet, and a timing at which the mobile terminal receives the packet, wherein the measuring comprises:
  calculating a PSNR (Picture Signal to Noise Ratio) based on the input signal for the compression encoding and the signal decoded from the output signal of the compression encoding;
  calculating a response time based on the transmission timing of the packet and the timing at which the mobile terminal receives the packet;
  deriving the video image quality from the calculated PSNR and response time; and
  deriving as the video image quality a sum between the PSNR and the response time, respectively with weighting.

* * * * *